United States Patent [19]

Malak

[11] Patent Number: 5,024,757
[45] Date of Patent: Jun. 18, 1991

[54] APPARATUS FOR REMOVING ICE FROM A CHOPPED OR CUT HOLE

[76] Inventor: Francis R. Malak, 3205 N. 29th St., Wausau, Wis. 54401

[21] Appl. No.: 518,167

[22] Filed: May 3, 1990

[51] Int. Cl.$^5$ ...................... B01D 35/02; B01D 35/28
[52] U.S. Cl. .................................. 210/136; 210/455; 210/470
[58] Field of Search .............. 210/136, 455, 464, 465, 210/470

[56] References Cited

U.S. PATENT DOCUMENTS

| | | | |
|---|---|---|---|
| 625,794 | 5/1899 | Newman | 210/136 |
| 1,066,788 | 7/1913 | Bowen | 210/464 |
| 1,073,081 | 9/1913 | Jacobson | 210/465 |
| 2,689,651 | 9/1954 | Horsdal | 210/455 |
| 3,289,850 | 12/1966 | Gubash | 210/470 |

OTHER PUBLICATIONS

"Flipper Dipper", the Ultimate Ice Skimmer, Tackle Tamer Products, Inc. (Publication date unknown).

Primary Examiner—W. Gary Jones
Attorney, Agent, or Firm—Andrus, Sceales, Starke & Sawall

[57] ABSTRACT

An apparatus for removing the ice chips which are formed when a hole is cut through the ice covering of a body of water, which ice chips are suspended in the water filling the hole, includes a thin-walled tubular body having a cross sectional size and shape corresponding to that of the hole and a one-way valve in the lower end of the tubular body which opens in response to downward movement of the body into the hole to admit the water and ice chips into the body above the valve and closes in response to reverse upward withdrawal of the body from the hole to retain the ice chips therein. In the preferred embodiment, the one-way valve comprises a butterfly valve including two semicircular wing plates which are provided with a pattern of holes to allow the water to readily drain back into the hole while retaining the ice chips thereon.

11 Claims, 1 Drawing Sheet

U.S. Patent    June 18, 1991    5,024,757
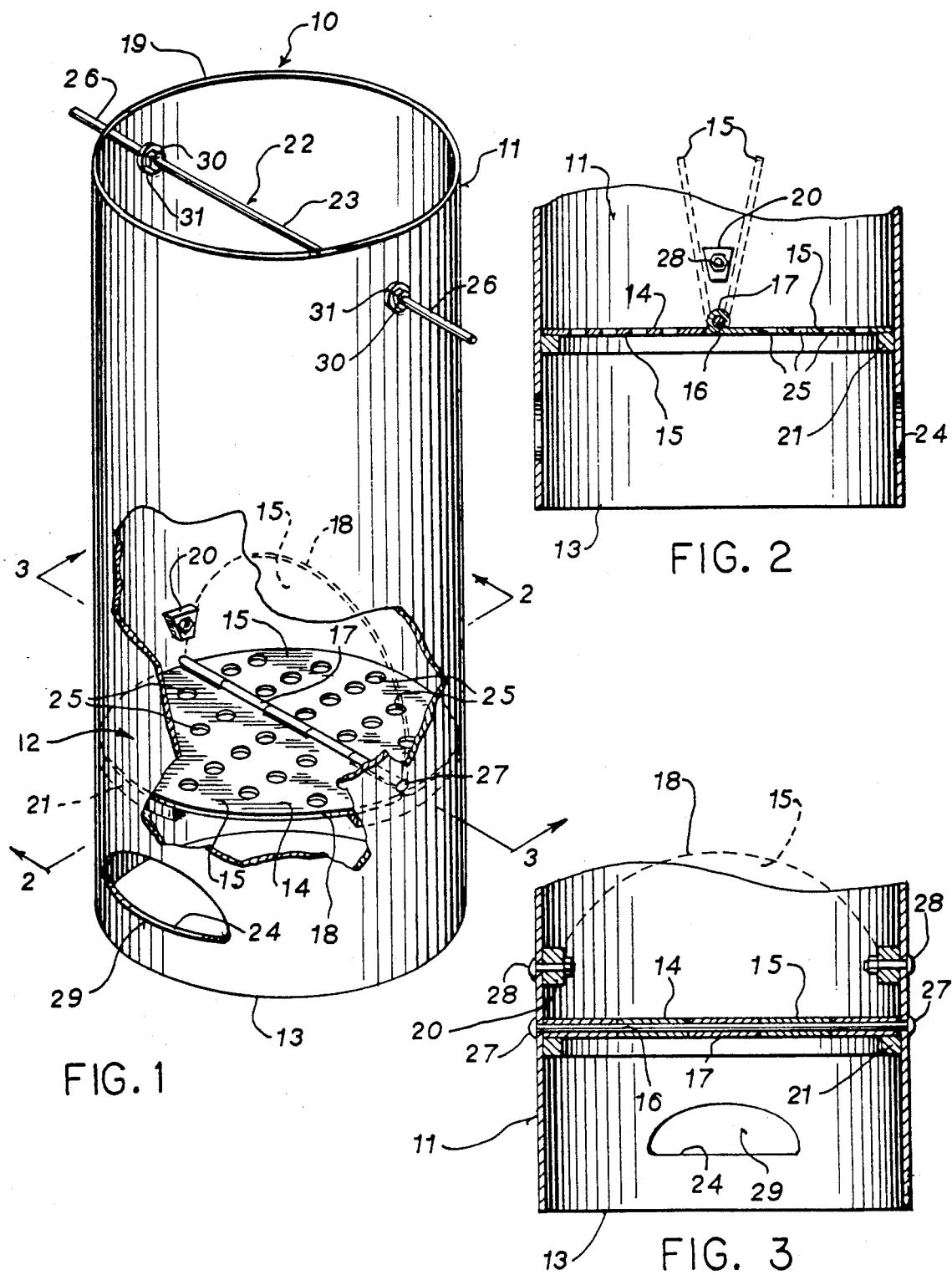

APPARATUS FOR REMOVING ICE FROM A CHOPPED OR CUT HOLE

BACKGROUND OF THE INVENTION

The present invention pertains to an apparatus for removing ice chips from a hole cut or chopped in the ice and, more particularly, to a device for removing the ice chips and the like which are suspended in the water which fills the hole when cut completely through the ice covering a body of water.

As is well known to ice fishermen, one of the more tedious tasks in preparation for ice fishing is cutting holes through the ice and removing the ice chips, slush and the like from the hole after it is cut. In recent times, the task of cutting the hole has been made substantially less laborious by the use of powered ice augers. However, the task of cleaning the ice chips from the cut hole is still essentially a manual task which is usually accomplished by using a hand-held strainer. It is also possible to utilize a powered ice auger to remove at least a portion of the chips when the auger is pulled out of the cut hole. However, it usually results in the removal of only a portion of the chips and slush and there is carried therewith a significant volume of water. Use of the ice auger to remove a portion of the chips is particularly undesirable when the hole is cut in the ice enclosed by a fishing shanty where it is desirable to prevent the accumulation of ice chips and water on the ice surface or on the floor of the fishing shanty.

There is a need, therefore, for an apparatus which will effectively clean ice chips from a hole cut in the ice which chips are suspended in the water which fills the hole after cutting is completed. The device should be of relatively simple construction, low cost, and operate efficiently so that the ice chips and slush may be quickly and easily cleared from the hole. Preferably, the apparatus should simultaneously strain the ice chips so that the water may drain back into the hole.

SUMMARY OF THE INVENTION

In accordance with the present invention an apparatus for removing suspended solid material from a water filled hole, and particularly for removing floating ice chips from a hole cut through a layer of ice over a body of water, comprises a thin-walled tubular body which has a cross sectional size and shape corresponding to that of the cut hole. A check valve is disposed within the lower end of the tubular body and adapted to admit water and suspended solid material, such as ice chips, into the tubular body in response to downward insertion of the body into the hole. As the tubular body is removed from the hole by reverse upward withdrawal, the check valve closes and retains the suspended solid material in the tubular body. Preferably, the check valve acts as a strainer to permit the water to drain from the upper portion of the tubular body in response to the upward withdrawal thereof from the hole, but to retain the ice chips or other solid material therein. The tubular body is preferably cylindrical and just slightly smaller in diameter than the cylindrical cut hole.

The check valve preferably comprises a butterfly valve which includes a pair of hinged wing plates mounted on a common transverse axis through the tubular body. The wing plates are both adapted for upward opening movement to a position approximately parallel to the axis of the tubular body and for downward closing movement to a generally coplanar position perpendicular to the axis of the body. In the preferred embodiment, the butterfly valve includes a hinge pin which extends through the tubular body on a diameter thereof to form the common transverse axis for the wing plates, and the wing plates are of semicircular shape and attached to the hinge pin along their diametral edges.

Upward opening movement of the wing plates is limited by a pair of abutments which are attached to the inside of the tubular body on diametrically opposite sides thereof and in a vertical plane through the hinge pin. Downward movement of the wing plates beyond their coplanar closed position is prevented by a circumferential stop ring which is attached to the inside of the tubular body immediately below the valve.

To provide the straining capability, the wing plates are perforated with a pattern of holes sized to permit water to drain from the tubular body and to retain the ice chips or other suspended solid material therein. The butterfly valve is preferably positioned spaced above the lower edge of the tubular body to provide a funnel or lead-in to the valve for the water and ice chips.

The upper end of the tubular body is provided with a handle for facilitating use of the apparatus and for preventing inadvertent loss thereof downward through the hole. The handle preferably comprises a rod extending through the body on a diameter thereof and radially beyond the outside surface of the tubular body. Alternately, the handle may comprise a radial outwardly flared edge or edge portions integral with the upper edge of the tubular body.

BRIEF DESCRIPTION OF THE DRAWINGS

FIG. 1 is a perspective view of the apparatus of the present invention, partly broken away to show details of the interior construction.

FIG. 2 is a partial vertical sectional view taken on line 2—2 of FIG. 1.

FIG. 3 is a partial vertical sectional view taken on line 3—3 of FIG. 1.

DETAILED DESCRIPTION OF THE PREFERRED EMBODIMENT

Referring initially to FIG. 1, the ice chip removal apparatus 10 of the present invention includes a thin-walled tubular body 11 which is preferably cylindrical in cross section and sized to be Just slightly smaller in diameter than a cylindrical hole cut in the ice, as with a powered ice auger. The tubular body 11 may be made of metal or plastic and formed in any convenient and well known manner. The most popular sizes of ice augers have cutting blade diameters of 6", 8" and 10" and the OD of the cylindrical tubular body 11 is preferably about ½" smaller than the auger blade with which it is intended to be used. The axial length of the cylinder is preferably about 24", but shorter or longer tubular bodies may also be used.

A one-way or check valve 12 is mounted within the cylindrical tubular body 11 spaced upward axially from the lower edge 13. With a tubular body having a length of about 24", the check valve 12 may be positioned about 6" from the lower edge 13. The check valve 12 preferably comprises a butterfly valve 14 including a pair of wing plates 15 that are mounted on a common transverse hinge pin 16 spanning the interior of the tubular body 11 on a diameter thereof. The wing plates 15 each have a semicircular shape and each is attached by its diametral edge 17 to the hinge pin 16, whereby the semicircular edges 18 of the wing plates may rotate upwardly to an open position with the plates closely adjacent one another and disposed approximately parallel to the axis of the tubular body 11. The open position of the wing plates 15 is shown in phantom in each of FIGS. 1-3. In their closed position, the wing plates 15 lie in a coplanar position generally perpendicular to the axis of the tubular body to substantially close the interior thereof.

The interior of the tubular body 11 above the check valve 12 is provided with a pair of abutments 20 to limit the extent of upward opening movement of the wing plates 15. The abutments 20 are attached above the ends of the hinge pin 16 so that they lie generally in a vertical plane through the pin. The function of the abutments will be described in more detail below as the use and operation of the apparatus is described. Also on the interior of tubular body 11, just below the butterfly valve 14, a circumferential stop ring 21 is disposed to prevent downward movement of the wing plates 15 beyond their fully closed coplanar position, as will also be described in more detail hereinafter. The upper end of the tubular body 11 is provided with a handle 22 in the form of a rod 23 which extends through the body on a diameter thereof and radially beyond the outside of the body in both directions. The tubular body may also be provided with supplemental handle means 29 in the form of cutouts 24 in opposite sides of the tubular body between the lower edge 13 and the check valve 12. In the preferred embodiment, the wing plates 15 are perforated with a pattern of holes 25 sized to permit the ready passage of water therethrough but to retain and prevent the passage of ice chips or other suspended solids which are intended to be removed from the hole.

The ice chip removal apparatus 10 in accordance with the present invention is utilized after a cylindrical hole has been cut or bored completely through the ice and water has risen in the hole approximately to the upper surface of the ice with the ice chips formed in cutting the hole suspended in the water. Such suspended ice chips are generally fairly densely packed and may extend downwardly nearly the full depth of the hole. The removal apparatus 10 is grasped by the rod handle 22 on the interior of the tubular body 11 and the tubular body is inserted downwardly into the hole. The resistive force of the water and chip suspension forces the wing plates 15 to rotate upwardly about the hinge pin 16 such that water and ice chips will move readily past the wing plates and into the tubular body above the check valve as the body continues to move downwardly into the hole. The cylindrical section of the body between the lower edge 13 and the butterfly valve 14 acts to help funnel the water and ice into the body, but the valve may be positioned immediately above the lower edge. When the tubular body is inserted to substantially its full length, its movement is reversed and the opposite resistive force of the water and ice chips immediately causes the wing plates 15 to rotate about the hinge pin 16 in the opposite direction to the closed full line position shown in each of the drawing figures. The closed wing plates 15 trap the ice chips in the portion of the tubular body above the plates and, in the preferred foraminous construction of the wing plates with the pattern of holes 25, the water which entered the upper portion of the tubular body along with the ice chips will immediately drain back into the hole, leaving only the substantially drained ice chips retained in the tubular body. The retained ice chips may be simply dumped from the tubular body at a convenient location by simply inverting the same, aided by the use of the cutouts 24 comprising supplemental handle 29.

When the apparatus is inserted into the hole and the wing plates 15 are moved into the open position, the abutments 20 prevent the wing plates from assuming a fully vertical back-to-back position which, depending upon the construction of the hinged joint, could allow both wing plates to rotate together in the same direction preventing closure of one-half of the tubular body or allow one or both of the plates to simply hang up and not properly rotate in the reverse direction when the apparatus is withdrawn from the hole. Thus, the abutments 20 prevent the wing plates 15 from rotating to a fully vertical position and, as is best shown in FIG. 2, assure that they will immediately move back to the closed position in response to reversal of movement of the tubular body to withdraw it from the hole.

Although the wing plates 15 and hinge pin 16 could be constructed to prevent back-flexing of the wing plates downwardly past their coplanar closed position, the heavy load imposed by the downward force of the ice chips and water above the closed valve prior to withdrawal makes it preferable to utilize the cylindrical stop ring 21 to provide adequate support for the edges of the wing plates. This also permits the use of a relatively simple construction for the hinged joint. In this regard, the hinge pin 16 may simply extend through the wall of the tubular body and be provided with opposite headed ends 27.

The rod 23 comprising the handle 22, as previously indicated, includes opposite extended portions 26 which project radially beyond the outside of the tubular body. These extended portions serve the useful purpose of preventing loss of the apparatus through the hole in the ice should the user lose the grip on the handle while it is being used. Because the apparatus preferably fits fairly closely within the hole, the extended portions 26 will readily engage the surface of the ice on diametrically opposite edges of the holes and prevent complete passage of the tubular body into the hole. As an alternate, the upper edge 19 of the tubular body may be flared or provided with tabbed portions which extend radially outwardly to accomplish the same function as the extended portions 26 of the handle rod 23.

Although the tubular body may be as long as or longer than the depth of the hole in the ice, such length is not necessary and the device will work effectively in holes having a depth greater than the length of the tubular body. In such cases, however, all of the ice chips may be removed in a multiple cycles of insertion and withdrawal from the hole. Specifically, by using an up and down pumping action, an additional amount of ice will be admitted with each downward stroke with the water draining out during the upward strokes in between. Several cycles may be required to completely clear the hole.

It is also possible to utilize a construction in which the wing plates 15 are solid and have no water drain holes. In this case, both the ice chips and most of the water will be withdrawn with the withdrawal of the tubular body and may be conveniently dumped therefrom together, as previously described. Collecting both the water and the ice chips, of course, adds substantially to the total weight required to be withdrawn, but if the hole in the ice is cut by means which creates a substantial portion of fine chips or slush, complete clearing of ice from the hole may be more readily and rapidly attained. In the preferred embodiment wherein the wing plates 15 are provided with a pattern of holes 25, holes having diameters in the range of 3/16" to 5/16" have been found to be suitable.

As previously indicated, the tubular body 11 may be made of metal or plastic. If the body is molded of a suitable plastic, the abutments 20 and the stop ring 21 may be molded integrally therewith. However, to simplify the molding process, it is preferable that the abutments and stop ring be separately formed and individually attached to the interior of the tubular body. For example, referring to the drawing, the abutments 20 may be attached to the interior of the tubular body by any type of suitable fastener, such as the nut and bolt combination 28 shown. Although the abutments are shown in the shape of a truncated wedge or trapezoid, small cylindrical disks or washers may also be utilized, as well as any other convenient shape. The extended portions 26 of the handle rod 22 may be threaded such that the handle can be secured in place by opposite pairs of nuts 30 and washers 31.

Various modes of carrying out the present invention are contemplated as being within the scope of the following claims particularly pointing out and distinctly claiming the subject matter which is regarded as the invention.

I claim:

1. An apparatus for removing suspended solid material from a water filled hole comprising:
   a thin-walled tubular body having a cross sectional size and shape corresponding to that of the hole;
   check valve means in the lower end of said tubular body for admitting water and suspended solid material into said tubular body in response to downward insertion of the body into the hole and for closing and retaining the solid material in said tubular body in response to reverse upward withdrawal of the body from the hole; and,
   strainer means formed integrally with said check valve means for permitting the water to drain from said tubular body in response to said upward withdrawal.

2. The apparatus as set forth in claim 1 wherein said tubular body is cylindrical.

3. An apparatus for removing ice chips from a hole cut through a sheet of ice covering a body of water, which chips are formed during cutting the hole and are suspended in the water filling the hole, said apparatus comprising:
   a thin-walled tubular body having a cross sectional size and shape corresponding to that of the hole;
   valve means in the lower end of said tubular body openable in response to downward insertion of said body into the hole for admitting the water and ice chips into said body and closable in response to reverse upward withdrawal of said body from the hole for retaining the ice chips in said tubular body;
   said valve means comprising a butterfly valve including a pair of wing plates hingedly mounted on a common traverse axis for upward opening movement to a position approximately parallel to the axis of said tubular body and for downward closing movement to a coplanar position generally perpendicular to the axis of said body; and,
   wherein said wing plates are perforated with holes sized to permit water to drain from the tubular body and to retain the ice chips therein.

4. The apparatus as set forth in claim 3 wherein said tubular body is cylindrical and said butterfly valve comprises:
   a hinge pin extending through said tubular body on the diameter thereof to form said common transverse axis; and,
   said wing plates being of semicircular shape and attached to said hinge pin along their diametral edges.

5. The apparatus as set forth in claim 4 including:
   means for limiting upward opening movement of said wing plates; and,
   means for preventing downward movement of said wing plates beyond said coplanar position.

6. The apparatus as set forth in claim 5 wherein said means for limiting upward opening movement of said wing plates comprises a pair of abutments attached to the inside of said tubular body on diametrically opposite sides thereof and in a vertical plane through said hinge pin.

7. The apparatus as set forth in claim 6 wherein said means for preventing downward movement of said wing plates comprises a circumferential stop ring attached to the inside of said tubular body immediately below said butterfly valve.

8. The apparatus as set forth in claim 4 wherein said butterfly valve is positioned spaced from the lower edge of said tubular body.

9. The apparatus as set forth in claim 4 including handle means attached to the upper end of said tubular body for facilitating use and for preventing the apparatus from downward movement through the hole.

10. The apparatus as set forth in claim 9 wherein said handle means comprises a rod extending through said tubular body on a diameter thereof and radially outward beyond the outside of said tubular body.

11. The apparatus as set forth in claim 9 wherein said handle means comprises a radial outward flared portion on the upper edge of said tubular body.

* * * * *